(12) United States Patent
Hong

(10) Patent No.: US 11,460,699 B2
(45) Date of Patent: Oct. 4, 2022

(54) AUGMENTED REALITY DEVICE, AUGMENTED REALITY SYSTEM AND INFORMATION PROMPT METHOD THEREOF

(71) Applicant: BOE TECHNOLOGY GROUP CO., LTD., Beijing (CN)

(72) Inventor: Tao Hong, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 734 days.

(21) Appl. No.: 16/337,536

(22) PCT Filed: Sep. 25, 2018

(86) PCT No.: PCT/CN2018/107323
§ 371 (c)(1),
(2) Date: Mar. 28, 2019

(87) PCT Pub. No.: WO2019/144634
PCT Pub. Date: Aug. 1, 2019

(65) Prior Publication Data
US 2021/0356742 A1   Nov. 18, 2021

(30) Foreign Application Priority Data
Jan. 29, 2018 (CN) .......................... 201810084344.3

(51) Int. Cl.
*G02B 27/01* (2006.01)
*G02B 5/30* (2006.01)
(Continued)

(52) U.S. Cl.
CPC ....... *G02B 27/0172* (2013.01); *G02B 5/3083* (2013.01); *G02B 27/0093* (2013.01); *G02B 27/10* (2013.01); *G02B 2027/0132* (2013.01)

(58) Field of Classification Search
CPC ........ G02B 27/0172; G02B 2027/0174; G02B 2027/0178; G02B 5/3083; G02B 27/0093; G02B 27/10; G02B 2027/0132
See application file for complete search history.

(56) References Cited

U.S. PATENT DOCUMENTS 9,523,852 B1  12/2016  Brown et al.
9,618,749 B2   4/2017  Deleeuw et al.
(Continued)

FOREIGN PATENT DOCUMENTS

CN  104395815 A  3/2015
CN  105683812 A  6/2016
(Continued)

OTHER PUBLICATIONS

Machine Translation of JP 06138432 (Year: 1994).*
(Continued)

*Primary Examiner* — Balram T Parbadia
*Assistant Examiner* — Matthew Y Lee
(74) *Attorney, Agent, or Firm* — Leason Ellis LLP

(57) ABSTRACT

An augmented reality device, an augmented reality system and an information prompt method thereof. The augmented reality device includes a micro display, an augmented reality element and an optical waveguide element. The micro display is configured to emit light carrying display content, the light includes a first light portion in a first polarization state and a second light portion in a second polarization state; the augmented reality element is configured to allow the first portion to convert from the first polarization state into the second polarization state, to allow the second light portion to convert from the second polarization state into the first polarization state, and to couple the first light portion in the second polarization state and the second light portion in the first polarization state to the optical waveguide element;

(Continued)

the first polarization state is perpendicular to the second polarization state.

18 Claims, 9 Drawing Sheets

(51) Int. Cl.
*G02B 27/00* (2006.01)
*G02B 27/10* (2006.01)

(56) References Cited

U.S. PATENT DOCUMENTS

| | | | | |
|---|---|---|---|---|
| 2013/0135722 | A1* | 5/2013 | Yokoyama | G02B 27/0172 359/489.08 |
| 2014/0347736 | A1 | 11/2014 | Liu et al. | |
| 2015/0002373 | A1* | 1/2015 | Kobayashi | A61B 5/02416 345/8 |
| 2015/0138451 | A1* | 5/2015 | Amitai | G02B 27/0179 349/11 |
| 2015/0220157 | A1* | 8/2015 | Marggraff | G06F 1/1686 345/156 |
| 2017/0242249 | A1* | 8/2017 | Wall | G02B 27/0176 |
| 2017/0357095 | A1 | 12/2017 | Amitai | |
| 2021/0149199 | A1* | 5/2021 | Guan | G02B 27/0172 |

FOREIGN PATENT DOCUMENTS

| | | | | |
|---|---|---|---|---|
| CN | 107229119 | A | 10/2017 | |
| CN | 107329273 | A | 11/2017 | |
| CN | 206684389 | U | 11/2017 | |
| GN | 104216116 | A | 12/2014 | |
| JP | 06138432 | * | 5/1994 | G03H 2225/22 |
| JP | H06138432 | A | 5/1994 | |

OTHER PUBLICATIONS

Chinese Office Action in corresponding Chinese Application No. 201810084344.3 dated Dec. 2, 2019 (an English translation attached hereto). 15 pages.

International Search Report and Written Opinion in corresponding International Patent Application No. PCT/CN2018/107323 dated Jan. 7, 2019. 14 pages.

* cited by examiner

AUGMENTED REALITY DEVICE, AUGMENTED REALITY SYSTEM AND INFORMATION PROMPT METHOD THEREOF

CROSS-REFERENCE TO RELATED PATENT APPLICATIONS

This application is a U.S. National Stage Application under 35 U.S.C. § 371 of International Patent Application No. PCT/CN2018/107323, filed Sep. 25, 2018, which claims the benefit of priority to Chinese patent application No. 201810084344.3, filed on Jan. 29, 2018, both of which are incorporated by reference in their entireties as part of the present application.

TECHNICAL FIELD

Embodiments of the present disclosure relate to an augmented reality device, an augmented reality system and an information prompt method thereof.

BACKGROUND

Augmented reality (AR) superimposes virtual information on real scene, integrates the virtual information and the real scene by a sensing equipment and a display equipment, and presents a new environment with real sense-perception effect to an observer ultimately.

SUMMARY

At least one embodiment of the present disclosure provides an augmented reality device, which comprises a micro display and an augmented reality element. The micro display is configured to emit light carrying display content, the light comprises a first light portion in a first polarization state and a second light portion in a second polarization state; the augmented reality element is configured to convert the first light portion from the first polarization state into the second polarization state, to convert the second light portion from the second polarization state into the first polarization state, and to couple out the first light portion in the second polarization state and the second light portion in the first polarization state; in which the first polarization state is perpendicular to the second polarization state.

For example, in an augmented reality device provided by an embodiment of the present disclosure, the augmented reality device further comprises an optical waveguide element, the optical waveguide element is configured to receive and transmit the first light portion and the second light portion which are coupled out by the augmented reality element; the augmented reality element comprises a polarization beam splitter, a first concave mirror, a second concave mirror, a first phase retarder and a second phase retarder; the polarization beam splitter is configured to receive the light originated from the micro display, to transmit the first light portion in the first polarization state, to reflect the second light portion in the second polarization state; the first light portion, which is transmitted by the polarization beam splitter, is configured to pass through the first phase retarder, to be reflected by the first concave mirror, and to pass through the first phase retarder again, in which the first light portion is converted from the first polarization state into the second polarization state under combined action of the first phase retarder and the first concave mirror; the second light portion, which is reflected by the polarization beam splitter, is configured to pass through the second phase retarder, to be reflected by the second concave mirror, and to pass through the second phase retarder again, in which the second light portion is converted from the second polarization state into the first polarization state under combined action of the second phase retarder and the second concave mirror; and the polarization beam splitter is further configured to reflect the first light portion in the second polarization state and to transmit the second light portion in the first polarization state, and to allow both the first light portion and the second light portion to be coupled onto an incident surface of the optical waveguide element.

For example, in an augmented reality device provided by an embodiment of the present disclosure, the augmented reality device further comprises an infrared light emitter and an infrared light detector. The infrared light emitter is configured to emit infrared light to the augmented reality element; the augmented reality element is configured to couple the infrared light into the incident surface of the optical waveguide element; the optical waveguide element is configured to transmit the infrared light to an eye via a semi-reflective semi-transmissive surface array; the optical waveguide element and the augmented reality element is further configured to transmit reflected infrared light which is reflected by the eye to the infrared light detector along a path which is opposite to a path of the infrared light; and the infrared light detector is configured to detect the reflected infrared light.

For example, in an augmented reality device provided by an embodiment of the present disclosure, the infrared light which is emitted by the infrared light emitter comprises a first infrared light portion in the first polarization state and a second infrared light portion in the second polarization state; the polarization beam splitter is further configured to transmit the first infrared light portion in the first polarization state, and to reflect the second infrared light portion in the second polarization state; the first infrared light portion, which is transmitted by the polarization beam splitter, is configured to pass through the first phase retarder, to be reflected by the first concave mirror, and to pass through the first phase retarder again, in which the first infrared light portion is converted from the first polarization state into the second polarization state under combined action of the first phase retarder and the first concave mirror; the second infrared light portion which is reflected by the polarization beam splitter is configured to pass through the second phase retarder, to be reflected by the second concave mirror, and to pass through the second phase retarder again, in which the second infrared light portion is converted from the second polarization state into the first polarization state under combined action of the second phase retarder and the second concave mirror; the polarization beam splitter is further configured to reflect the first infrared light portion in the second polarization state and to transmit the second infrared light portion in the first polarization state, and to allow both the first infrared light portion and the second infrared light portion to be coupled onto the incident surface of the optical waveguide element; and the optical waveguide element is configured to transmit the first infrared light portion and the second infrared light portion after coupling to the eye via the semi-reflective semi-transmissive surface array.

For example, in an augmented reality device provided by an embodiment of the present disclosure, the optical waveguide element is further configured to transmit the reflected infrared light which is reflected by the eye to the polarization beam splitter via the semi-reflective semi-transmissive surface array, the reflected infrared light comprises a first reflected light portion in the second polarization state and a second reflected light portion in the first polarization state; the polarization beam splitter is further configured to reflect the first reflected light portion in the second polarization state, and to transmit the second reflected light portion in the first polarization state; the first reflected light portion which is reflected by the polarization beam splitter and is in the second polarization state is configured to pass through the first phase retarder, to be reflected by the first concave mirror, and to pass through the first phase retarder again, in which the first reflected light portion is converted from the second polarization state into the first polarization state under combined action of the first phase retarder and the first concave mirror; the second reflected light portion, which is transmitted by the polarization beam splitter and is in the first polarization state, is configured to pass through the second phase retarder, to be reflected by the second concave mirror, and to pass through the second phase retarder again, in which the second reflected light portion is converted from the first polarization state into the second polarization state under combined action of the second phase retarder and the second concave mirror; and the polarization beam splitter is further configured to transmit the first reflected light portion in the first polarization state and to reflect the second reflected light portion in the second polarization state, and to allow both the first reflected light portion and the second reflected light portion to pass through the polarization beam splitter and to be transmitted to the infrared light detector.

For example, in an augmented reality device provided by an embodiment of the present disclosure, both the first phase retarder and the first concave mirror are provided at a first side of the augmented reality element; both the second phase retarder and the second concave mirror are provided at a first end of a third side, which is adjacent to the first side, of the augmented reality element, the first end of the third side is closer to the first side; and the incident surface of the optical waveguide element is provided at a first end of a fourth side, which is adjacent to the first side, of the augmented reality element, the first end of the fourth side is closer to the first side and is opposite to the first end of the third side.

For example, in an augmented reality device provided by an embodiment of the present disclosure, the micro display, the infrared light emitter and the infrared light detector are provided at a second side, which is opposite to the first side, of the augmented reality element.

For example, in an augmented reality device provided by an embodiment of the present disclosure, the augmented reality element further comprises a first infrared beam splitter; the micro display is provided at a second side, which is opposite to the first side, of the augmented reality element; both the infrared light emitter and the infrared light detector are provided at a second end of the third side of the augmented reality element, the second end of the third side is closer to the second side; or, both the infrared light emitter and the infrared light detector are provided at a second end of the fourth side of the augmented reality element, the second end of the fourth side is closer to the second side; and the first infrared beam splitter is configured to reflect the infrared light which is originated from the infrared light emitter to the polarization beam splitter, and to allow the light emitted by the micro display to be transmitted and to be incident onto the polarization beam splitter.

For example, in an augmented reality device provided by an embodiment of the present disclosure, the augmented reality element further comprises a second infrared beam splitter; both the infrared light emitter and the infrared light detector are provided at a second side, which is opposite to the first side, of the augmented reality element; the micro display is provided at a second end of the third side of the augmented reality element, the second end of the third side is closer to the second side; or, the micro display is provided at a second end of the fourth side of the augmented reality element, the second end of the fourth side is closer to the second side and is opposite to a second end of the third side; and the second infrared beam splitter is configured to allow the infrared light which is originated from the infrared light emitter to be transmitted and be incident onto the polarization beam splitter, and to reflect the light emitted by the micro display to the polarization beam splitter.

For example, in an augmented reality device provided by an embodiment of the present disclosure, the semi-reflective semi-transmissive surface array is provided in the optical waveguide element and comprises a plurality of semi-reflective semi-transmissive mirrors which are arranged in an array; and the semi-reflective semi-transmissive surface array is configured to: transmit the light and the infrared light, which enter from the incident surface of the optical waveguide element and incident onto the semi-reflective semi-transmissive surface array, to the eye; and transmit the reflected infrared light which is reflected by the eye to the incident surface of the optical waveguide element, so as to allow the reflected infrared light to enter the augmented reality element.

For example, in an augmented reality device provided by an embodiment of the present disclosure, the first polarization state is p-polarization state, the second polarization state is s-polarization state, and the first phase retarder and the second phase retarder are quarter-wave phase retarders.

At least one embodiment of the present disclosure further provides an augmented reality system, which comprises a controller and the augmented reality device provided by the embodiments of present disclosure. The controller is configured to: determine whether or not a user related to the augmented reality device is in a fatigue state based on intensity of the reflected infrared light which is detected by the infrared light detector; generate a control signal in a case where it is determined that the user is in the fatigue state; and provide prompt information based on the control signal.

For example, in an augmented reality system provided by an embodiment of the present disclosure, the controller is configured to determine whether or not the user is in the fatigue state based on closure time or a closure frequency of an eyelid of the user.

For example, an augmented reality system provided by an embodiment of the present disclosure further comprises a sensor. The sensor is configured to collect a physiological parameter of the user, and the sensor comprises at least one of a blood pressure sensor and a pulse sensor.

For example, in an augmented reality system provided by an embodiment of the present disclosure, the controller is further configured to determine whether or not the user is in an abnormal state based on the physiological parameter; generate a control signal in a case where the user is in the abnormal state; and provide prompt information based on the control signal.

For example, an augmented reality system provided by an embodiment of the present disclosure further comprises an electric pulse generator and a surface electrode. The electric pulse generator is configured to generate an electric pulse signal in response to the control signal and to transmit the electric pulse signal to the surface electrode.

For example, an augmented reality system provided by an embodiment of the present disclosure further comprises a positioning device. The positioning device is configured to acquire position information of the user.

For example, an augmented reality system provided by an embodiment of the present disclosure further comprises a voice generator. The voice generator is configured to play the prompt information in response to the control signal.

For example, an augmented reality system provided by an embodiment of the present disclosure further comprises an image rendering device. The image rendering device is configured to render image corresponding to the prompt information in response to the control signal, and the micro display is configured to emit light carrying the prompt information.

For example, an augmented reality system provided by an embodiment of the present disclosure further comprises a communication device. The communication device is configured to communicate with a preset contact person in response to the control signal.

At least one embodiment of the present disclosure further provides an information prompt method for the augmented reality system, which comprises: emitting the infrared light to the eye; determining whether or not the user, which is related to the augmented reality system, is in the fatigue state based on the intensity of the reflected infrared light which is returned from the eye; generating the control signal in the case where it is determined that the user is in the fatigue state; and providing the prompt information based on the control signal.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Because geometric optical waveguide type augmented reality devices have the advantages such as light weight, small size, and light and thin profile (thickness may be smaller than 2 mm), the geometric optical waveguide type augmented reality devices have attracted wide attentions, and a geometric optical waveguide realizes coupling in and coupling out of light through a reflective surface and a semi-reflective semi-transmissive surface array in a planar waveguide.

Figure 1:
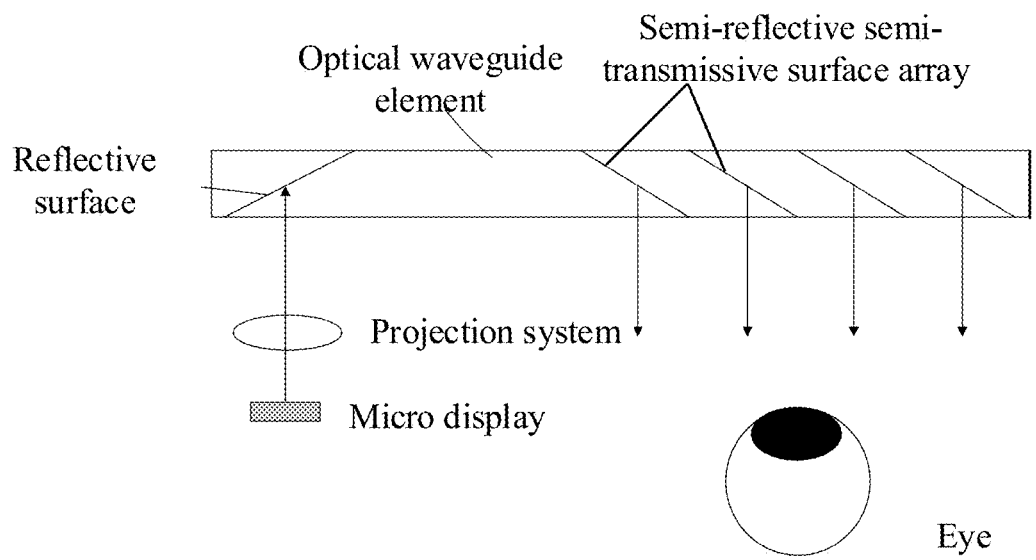
FIG. 1 is a schematic diagram of an exemplary augmented reality device.

For example, FIG. 1 illustrates an augmented reality device, the augmented reality device is mainly formed of three parts which are an optical waveguide element, a projection system and a micro display. Light of an image displayed by the micro display enters the optical waveguide element after the image is enlarged and projected by the projection system and is incident onto the reflective surface of the optical waveguide element, the light satisfies the total reflection condition after the light is reflected by the reflective surface, such that coupling in of an image signal is realized.

The image signal, which is coupled into the optical waveguide element, propagates in the optical waveguide element through total reflection, and is incident onto the semi-reflective semi-transmissive surface array ultimately, part of the light does not satisfy the total reflection condition any more after being reflected by a semi-reflective semi-transmissive mirror, and the coupling out of the image signal is realized. Another part of the light passes through the semi-reflective semi-transmissive mirror and further propagates in the optical waveguide element until the another part of the light is incident onto the semi-reflective semi-transmissive surface array next time and light beam splitting occurs again, the light, which is coupled out through the semi-reflective semi-transmissive surface array for the successively times, enters into an eye (for example, a human eye), and thus the propagation of the image signal is accomplished.

Meantime, light in the real-world scene can directly pass through the optical waveguide element and enter the eye, the optical path for display and the transmissive optical path superposes at the position where the eye is, thus realizing transmissive near eye display, that is, the virtual information and the real word scene can be integrated and presented to the observer simultaneously.

In the augmented reality device as illustrated in FIG. 1, the light emitted by the micro display may comprise light in different polarization states, when the light in different polarization states passes the projection system, for example, a polarization beam splitter in the projection system allows light in only one polarization state to transmit (or to be reflected), this causes the light which is incident onto the incident surface of the optical waveguide element with the loss of light in other polarization state(s), thus the light throughput efficiency of the augmented reality device is relatively low, and high brightness augmented reality display cannot be realized. Furthermore, it is necessary to provide a projection system in the augmented reality device as illustrated in FIG. 1, such that the structure is complex.

At least one embodiment of the present disclosure provides an augmented reality device, which comprises a micro display and an augmented reality element. The micro display is configured to emit light carrying display content, the light comprises a first light portion in a first polarization state and a second light portion in a second polarization state; the augmented reality element is configured to convert the first light portion from the first polarization state into the second polarization state, to convert the second light portion from the second polarization state into the first polarization state, and to couple out the first light portion in the second polarization state and the second light portion in the first polarization state. At least one embodiment of the present disclosure further provides an augmented reality system and an information prompt method thereof which are corresponding to the above-mentioned augmented reality device.

In the augmented reality device, the augmented reality system and the information prompt method thereof which are provided by the embodiments of the present disclosure, by allowing the augmented reality element to maximize utilization efficiency of the light emitted by the micro display, the light throughput efficiency is improved, such that the display brightness of the augmented reality device can be improved. The augmented reality device can also be used to detect fatigue degree of a user, and to provide prompt information. For example, certain measures may be further taken to allow the user to stay awake when it is determined that the user in the fatigue state, such that improved safety can be achieved. Meanwhile, the augmented reality device does not need complex projection system, such that the structure is simple.

The embodiments of the present disclosure will be described in detail with reference to the accompanying drawing.

Figure 2:
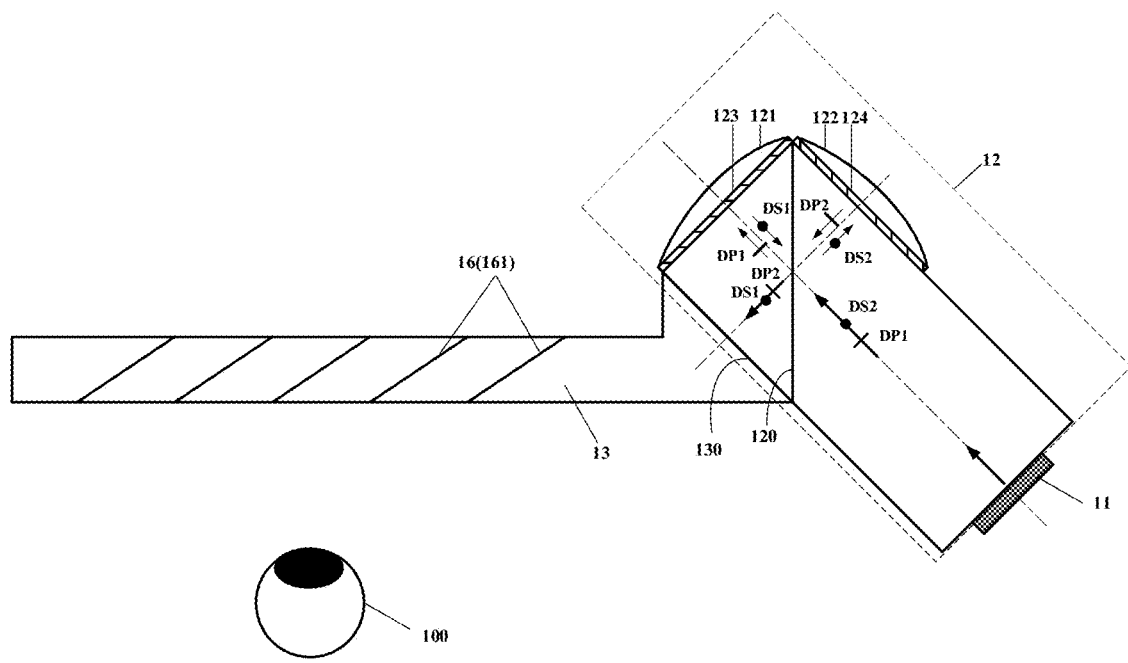
FIG. 2 is a schematic diagram of an augmented reality device provided by an embodiment of the present disclosure.

An embodiment of the present disclosure provides an augmented reality device, and as illustrated in FIG. 2, the augmented reality device comprises a micro display 11 and an augmented reality element 12.

The micro display 11 is configured to emit light carrying display content, the light comprises first light portion DP1 in a first polarization state and second light portion DS2 in a second polarization state. The augmented reality element 12 is configured to convert the first light portion DP1 from the first polarization state into the second polarization state, to convert the second light portion DS2 from the second polarization state into the first polarization state, and to couple out the first light portion DS1 in the second polarization state and the second light portion DP2 in the first polarization state, for example, into an optical waveguide element 13.

For example, the first light portion DS1 in the second polarization state and the second light portion DP2 in the first polarization state can be coupled into the optical waveguide element 13 via the incident surface 130 of the optical waveguide element 13. For example, the incident surface 130 of the optical waveguide element 13 is the surface connecting the optical waveguide element 13 with the augmented reality element 12.

In the present disclosure, for the convenience of description, the first light portion in the first polarization state is denoted as "DP1", the first light portion in the second polarization state is denoted as "DS1", the second light portion in the second polarization state is denoted as "DS2", and the second light portion in the first polarization state is denoted as "DP2".

It should be understood that, the light, which is emitted by the micro display 11 and carries the display content, is for example light in a non-linear polarization state, and may be in a circular polarization state, in an elliptical polarization, or in a partially polarization state. In the embodiments of the present disclosure, the first polarization state, for example, is p-polarization state, the second polarization state, for example, is s-polarization state, and light in all polarization state can be decomposed into linear polarized light in p-polarization state and linear polarized light in s-polarization state. The following embodiments are described in the same way; no further descriptions will be given.

In the augmented reality device provided by the embodiments of the present disclosure, the augmented reality element converts the first light portion in the first polarization state and the second light portion in the second polarization state, which are of the light emitted by the micro display, respectively into the first light portion in the second polarization state and the second light portion in the first polarization state, and couples the first light portion in the first polarization state and the second light portion in the second polarization state, for example, into the optical waveguide element. By this way, the utilization rate of the light emitted by the micro display can be improved, the light throughput efficiency of the augmented reality device can be improved, such that the display brightness of the augmented reality device can be improved.

For example, in an embodiment of the present disclosure, as illustrated in FIG. 2, the augmented reality device further comprises the optical waveguide element 13, the optical waveguide element 13 is configured to receive and transmit the first light portion and the second light portion which are coupled out by the augmented reality element 12. For example, the first light portion is in the second polarization state, the second light portion is in the first polarization state.

As illustrated in FIG. 2, the augmented reality element 12 comprises a polarization beam splitter 120, a first concave mirror 121, a second concave mirror 122, a first phase retarder 123 and a second phase retarder 124. For example, both the first phase retarder 123 and the second phase retarder 124 are quarter-wave phase retarders.

For example, as illustrated in FIG. 2, the polarization beam splitter 120 is configured to receive the light originated from the micro display 11, transmit the first light portion DP1 in the first polarization state, and reflect the second light portion DS2 in the second polarization state.

For example, as illustrated in FIG. 2, the first light portion DP1 in the first polarization state, which is transmitted by the polarization beam splitter 120, is configured to pass through the first phase retarder 123, be reflected by the first concave mirror 121, and pass through the first phase retarder 123 again. For example, the first light portion DP1 in the first polarization state is converted into left-circularly polarized light (or right-circularly polarized light) after the first light portion DP1 in the first polarization state passes through the first phase retarder 123, then the first light portion DP1 is converted into right-circularly polarized light (or left-circularly polarized light) after the first light portion DP1 is reflected by the first concave mirror 121, the first light portion DP1 is converted into the linear polarized light in the second polarization state after the first light portion DP1 passes through the first phase retarder 123 again, that is, under the combined action of the first phase retarder 123 and the first concave mirror 121, the first light portion is converted from the first polarization state into the second polarization state (that is, the first light portion DP1 in the first polarization state is converted into the first light portion DS1 in the second polarization state).

The second light portion DS2 in the second polarization state, which is reflected by the polarization beam splitter 120, is configured to pass through the second phase retarder 124, be reflected by the second concave mirror 122, and pass through the second phase retarder again 124. For example, the second light portion DS2 in the second polarization state is converted into left-circularly polarized light (or right-circularly polarized light) after the second light portion DS2 in the second polarization state passes through the second phase retarder 124, then the second light portion DS2 is converted into right-circularly polarized light (or left-circularly polarized light) after the second light portion DS2 is reflected by the second concave mirror 122, the second light portion DS2 is converted into the linear polarized light in the first polarization state after the second light portion DS2 passes through the second phase retarder again 124, that is, under the combined action of the second phase retarder 124 and the second concave mirror 122, the second light portion is converted from the second polarization state into the first polarization state (that is, the second light portion DS2 in the second polarization state is converted into the second light portion DP2 in the first polarization state).

For example, the polarization beam splitter 120 is further configured to reflect the first light portion DS1 in the second polarization state and to transmit the second light portion DP2 in the first polarization state, to allow both the first light portion and the second light portion to be coupled onto the incident surface 130 of the optical waveguide element 13 and to pass through the incident surface 130 and to enter the optical waveguide element 13.

The light, which is coupled into the optical waveguide element 13, propagates in the optical waveguide element 13 via total reflection, and is incident onto a semi-reflective semi-transmissive surface array 16 ultimately. For example, the semi-reflective semi-transmissive surface array 16 is provided in the optical waveguide element 13 and comprises a plurality of semi-reflective semi-transmissive mirrors 161 which are arranged in an array. For example, the semi-reflective semi-transmissive surface array 16 is configured to allow the light, which enters from the incident surface 130 of the optical waveguide element 13 and is incident onto the semi-reflective semi-transmissive surface array 16, to be transmitted to an eye 100.

Part of the light does not satisfy the total reflection condition any more after being reflected by the semi-reflective semi-transmissive mirror 161, such that coupling out of the light is realized. Another part of the light continues to propagate in the optical waveguide element 13 based on total reflection, after passing through the semi-reflective semi-transmissive mirror 161, until the another part of the light is incident onto another semi-reflective semi-transmissive mirror 161 again and light beam splitting occurs again, the light, which is coupled out through the semi-reflective semi-transmissive surface array 16 for the successively times, is transmitted to the eye 100, and the propagation of the display content is accomplished.

It should be understood that, in the embodiments of the present disclosure, the eye 100, for example, may be a human eye, but no limitation will be given to the present disclosure in this respect, as long as the eye 100 can receive the light coupled out from the optical waveguide element 13. For example, the eye 100 may also comprise an eye of an animal, the following embodiments are described by taking the case where the eye 100 is a human eye as an example.

It should be understood that, as illustrated in FIG. 2, the micro display 11 is provided at the focal point of the first concave mirror 121. For example, the radius of the first concave mirror 121 is R, the distance between the micro display 11 and the first concave mirror 121 is equal to the focal length f, and the focal length f satisfies f=R/2.

Figure 3:
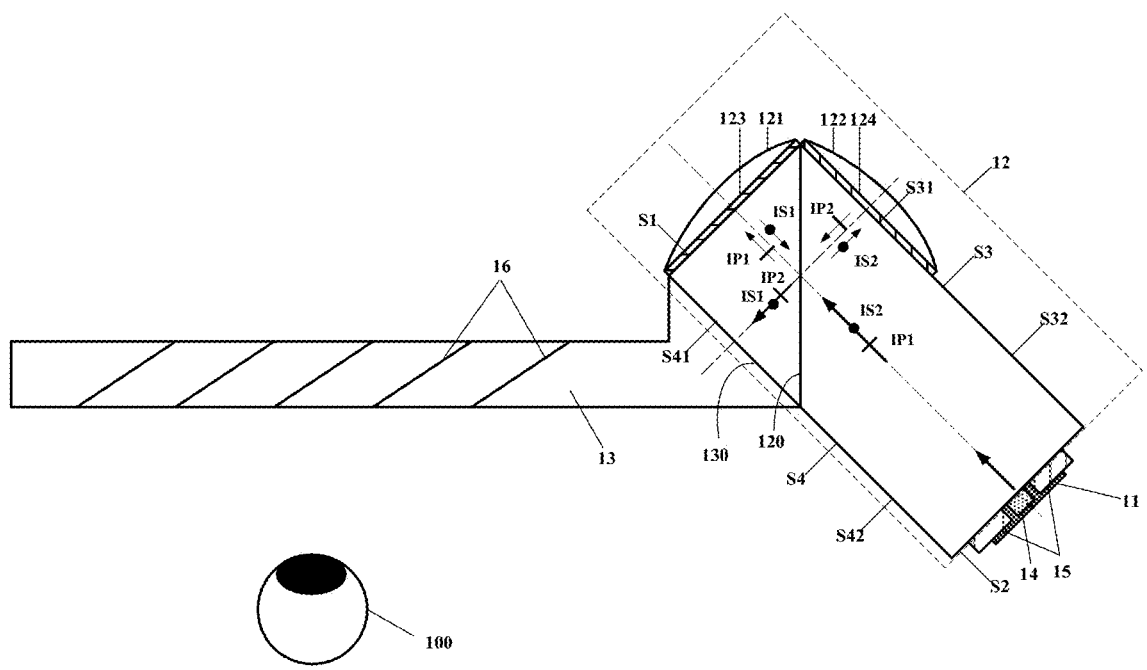
FIG. 3 is a first schematic diagram of an augmented reality device provided by another embodiment of the present disclosure.

For example, in an embodiment of the present disclosure, as illustrated in FIG. 3, the augmented reality device may further comprise an infrared light emitter 14 and an infrared light detector 15.

The infrared light emitter 14 is configured to emit infrared light to the augmented reality element 12. The augmented reality element 12 is configured to couple the infrared light onto the incident surface 130 of the optical waveguide element 13. The optical waveguide element 13 is configured to allow the infrared light to be transmitted to the eye 100 via the semi-reflective semi-transmissive surface array 16, for example, the eye 100 is a human eye. The optical waveguide element 13 and the augmented reality element 12 are further configured to allow the reflected infrared light which is reflected by the eye 100 to be transmitted to the infrared light detector 15 along a propagation path which is opposite to the path of the infrared light. The infrared light detector 15 is configured to detect the reflected infrared light.

For example, as illustrated in FIG. 3, the infrared light which is emitted by the infrared light emitter 14 comprises a first infrared light portion IP1 in the first polarization state and the second infrared light portion IS2 in the second polarization state. The polarization beam splitter 120 is further configured to transmit the first infrared light portion IP1 in the first polarization state, and to reflect the second infrared light portion IS2 in the second polarization state.

In the present disclosure, for the convenience of description, the first infrared light portion in the first polarization state is denoted as "IP1", the first infrared light portion in the second polarization state is denoted as "IS1", the second infrared light portion in the second polarization state is denoted as "IS2", the second infrared light portion in the first polarization state is denoted as "IP2".

For example, as illustrated in FIG. 3, the first infrared light portion IP1 in the first polarization state, which is transmitted by the polarization beam splitter 120, is configured to pass through the first phase retarder 123, be reflected by the first concave mirror 121, and pass through the first phase retarder 123 again, under the combined action of the first phase retarder 123 and the first concave mirror 121, the first infrared light portion is converted from the first polarization state into the second polarization state (that is, the first infrared light portion IP1 in the first polarization state is converted into the first infrared light portion IS1 in the second polarization state).

The second infrared light portion IS2 in the second polarization state, which is reflected by the polarization beam splitter 120, is configured to pass through the second phase retarder 124, to be reflected by the second concave mirror 122, and to pass through the second phase retarder again 124, under the combined action of the second phase retarder 124 and the second concave mirror 122, the second infrared light portion is converted from the second polarization state into the first polarization state (that is, the second infrared light portion IS2 in the second polarization state is converted into the second infrared light portion IP2 in the first polarization state).

It should be understood that, the conversion between the first polarization state and the second polarization state may refer to the descriptions regarding the light emitted by the micro display in the above-mentioned embodiments, and no further descriptions will be given here.

For example, the polarization beam splitter 120 is further configured to reflect the first infrared light portion IS1 in the second polarization state and to transmit the second infrared light portion IP2 in the first polarization state, to allow both the first infrared light portion and the second infrared light portion to be coupled onto the incident surface 130 of the optical waveguide element 13.

For example, the optical waveguide element 13 is configured to allow the first infrared light portion and the second infrared light portion after coupling by the semi-reflective semi-transmissive surface array 16 to be transmitted to the eye 100. For example, the semi-reflective semi-transmissive surface array 16 may further be configured to allow the infrared light, which enters from the incident surface 130 of the optical waveguide element 13 and is incident onto the semi-reflective semi-transmissive surface array 16, to be transmitted to the eye 100. It should be understood that, the descriptions regarding the working principle of the semi-reflective semi-transmissive surface array 16 may refer to corresponding descriptions in the above-mentioned embodiments, and no further descriptions will be given here.

In the embodiments of the present disclosure, the infrared light, which is transmitted to the eye 100 and is reflected by the eye 100, is referred to as the reflected infrared light. In the following, the processes that the reflected infrared light passes through the optical waveguide element 13 and the augmented reality element 12 and is transmitted to the infrared light detector 15 are described.

For example, the semi-reflective semi-transmissive surface array 16 may further be configured to allow the reflected infrared light, which is reflected by the eye 100, to be transmitted to the incident surface 130 of the optical waveguide element 13, so as to allow the reflected infrared light to enter the augmented reality element 12.

Figure 4:
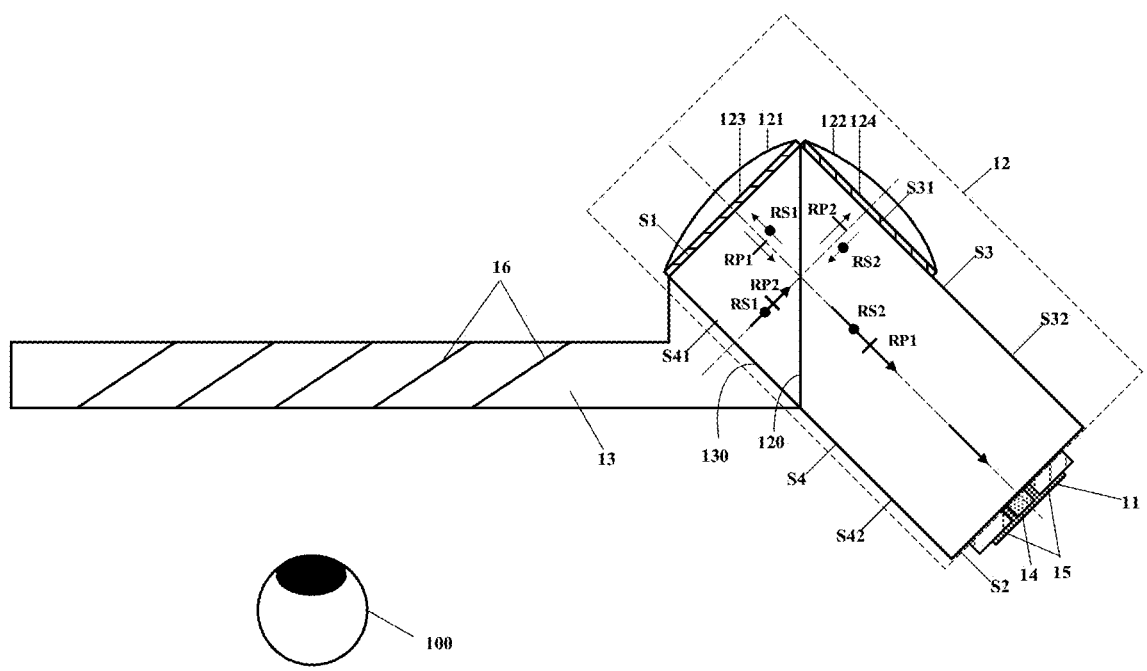
FIG. 4 is a second schematic diagram of an augmented reality device provided by another embodiment of the present disclosure.

For example, as illustrated in FIG. 4, the optical waveguide element 13 is further configured to allow the reflected infrared light, which is reflected by the eye 100, to be transmitted to the polarization beam splitter 120 via the semi-reflective semi-transmissive surface array 16, the reflected infrared light comprises a first reflected light portion RS1 in the second polarization state and a second reflected light portion RP2 in the first polarization state.

In the present disclosure, for the convenience of description, the first reflected light portion in the first polarization state is denoted as "RP1", the first reflected light portion in the second polarization state is denoted as "RS1", the second reflected light portion in the second polarization state is denoted as "RS2", the second reflected light portion in the first polarization state is denoted as "RP2".

For example, the polarization beam splitter 120 is further configured to reflect the first reflected light portion RS1 in the second polarization state, and to transmit the second reflected light portion RP2 in the first polarization state.

For example, as illustrated in FIG. 4, the first reflected light portion RS1 in the second polarization state, which is reflected by the polarization beam splitter 120, is configured to pass through the first phase retarder 123, be reflected by the first concave mirror 121, and pass through the first phase retarder 123 again. Under the combined action of the first phase retarder 123 and the first concave mirror 121, the first reflected light portion is converted from the second polarization state into the first polarization state, that is, the first reflected light portion RS1 in the second polarization state is converted into the first reflected light portion RP1 in the first polarization state.

The second reflected light portion RP2 in the first polarization state, which is transmitted by the polarization beam splitter 120, is configured to pass through the second phase retarder 124, be reflected by the second concave mirror 122, and pass through the second phase retarder 124 again. Under the combined action of the second phase retarder 124 and the second concave mirror 122, the second reflected light portion is converted from the first polarization state into the second polarization state, that is, the second reflected light portion RP2 in the first polarization state is converted into the second reflected light portion RS2 in the second polarization state.

For example, the polarization beam splitter 120 is further configured to transmit the first reflected light portion RP1 in the first polarization state and to reflect the second reflected light portion RS2 in the second polarization state, to allow both the first reflected light portion and the second reflected light portion to pass through the polarization beam splitter 120 and to be transmitted to the infrared light detector 15.

It should be understood that, no limitations will be given to the number of the infrared light detectors 15 that are provided in the embodiments of the present disclosure. For example, as illustrated in FIG. 3 and FIG. 4, two infrared light detectors 15 may be provided. In some embodiments, only one infrared light detector 15 may be provided. For another example, three or more infrared light detectors may be provided. Furthermore, in FIG. 3 and FIG. 4, for the sake of clear illustration, the propagation path of the light which is emitted by the micro display 11 is not indicated, the propagation path of the light which is emitted by the micro display 11 may refer to FIG. 2, the following embodiments are the same in this aspect, and no further description will be given.

For example, as illustrated in FIG. 3 and FIG. 4, both the first phase retarder 123 and the first concave mirror 121 are provided at the first side S1 of the augmented reality element 12. Both the second phase retarder 124 and the second concave mirror 122 are provided at the first end S31 of the third side S3, which is adjacent to the first side S1, of the augmented reality element 12, the first end S31 of the third side S3 is closer to the first side S1. The incident surface 130 of the optical waveguide element 13 is provided at the first end S41 of the fourth side S4, which is adjacent to the first side S1, of the augmented reality element 12, the first end S41 of the fourth side S4 is closer to the first side S1 and is opposite to the first end S31 of the third side S3.

For example, in an embodiment of the present disclosure, as illustrated in FIG. 3 and FIG. 4, the micro display 11, the infrared light emitter 14 and the infrared light detector 15 may be all provided at the second side S2, which is opposite to the first side S1, of the augmented reality element 12.

Figure 5:
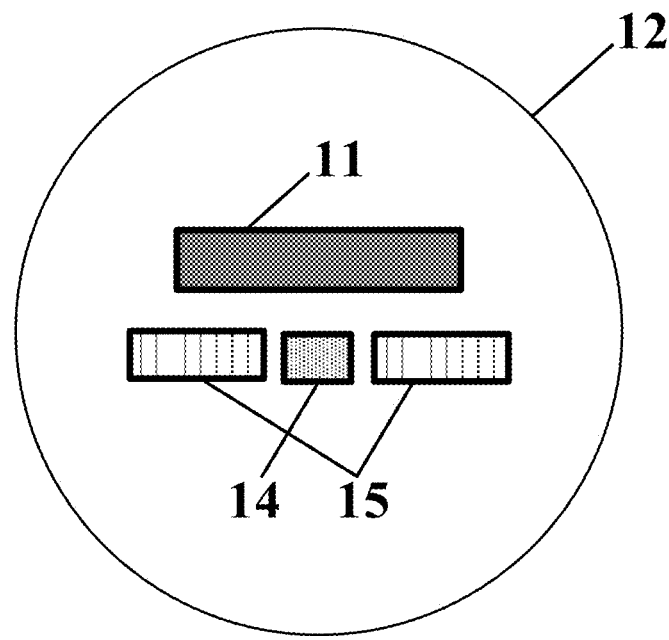
FIG. 5 is a side view of a second side of the augmented reality element as illustrated in FIG. 4.

It should be understood that, because FIG. 3 and FIG. 4 are top views, the micro display 11 is partially shielded by the infrared light emitter 14 and the infrared light detector 15. FIG. 5 illustrates a side view of the second side S2 of the augmented reality element 12 as illustrated in FIG. 4. It should be understood that, FIG. 5 illustrates only an example of position relationships between the micro display 11 and the infrared light emitter 14, and between the micro display 11 and the infrared light detector 15, other position relationships may be adopted, and no limitation will be given in the embodiments of the present disclosure in this respect.

Figure 6:
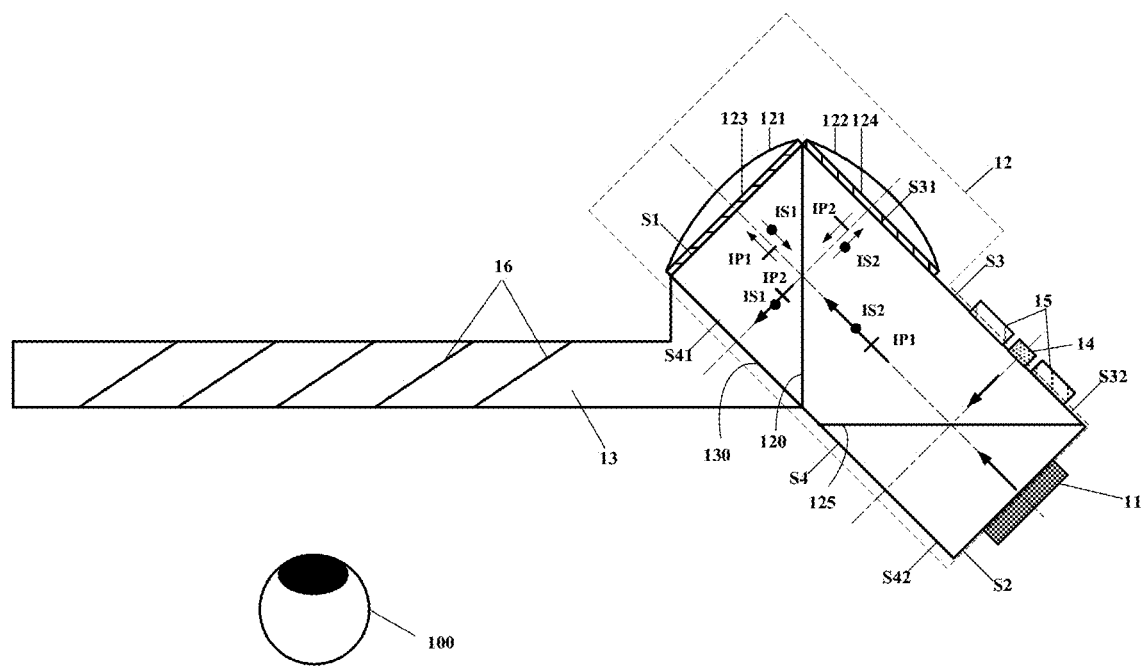
FIG. 6 is a schematic diagram of an augmented reality device provided by further another embodiment of the present disclosure.

For example, in an embodiment of the present disclosure, as illustrated in FIG. 6, the augmented reality element 12 may further comprise a first infrared beam splitter 125. The micro display 11 is provided at the second side S2, which is opposite to the first side S1, of the augmented reality element 12. Both the infrared light emitter 14 and the infrared light detector 15 are provided at the second end of S32 of the third side S3 of the augmented reality element 12, the second end of S32 of the third side S3 is closer to the second side S2.

For example, the first infrared beam splitter 125 is configured to allow the infrared light, which is originated from the infrared light emitter 14, to be reflected to the polarization beam splitter 120, and to allow the light, which is emitted by the micro display 11, to be transmitted and be incident onto the polarization beam splitter 120. That is, the function of the first infrared beam splitter 125 is to reflect the infrared light and to transmit the light with other wavelengths, and thus impact may not be caused for the light emitted by the micro display 11.

Figure 7:
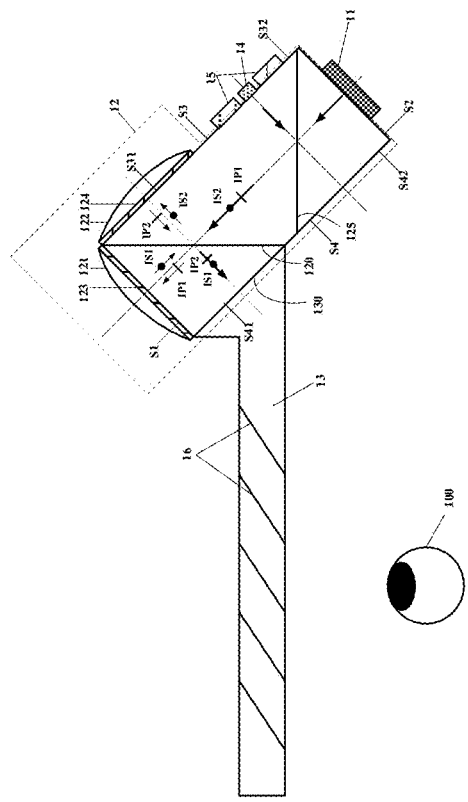
FIG. 7 is a schematic diagram of a binocular type of the augmented reality device as illustrated in FIG. 6.
Figure 7:
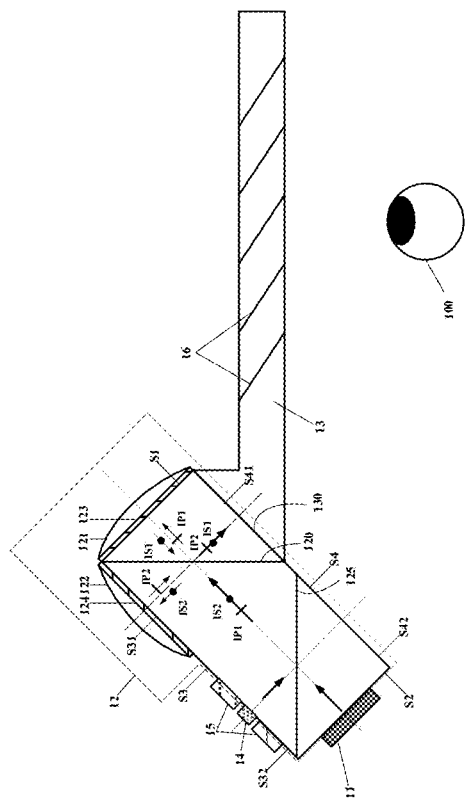

For example, the augmented reality device provided by the embodiments of the present disclosure may be specifically implemented as glasses. For example, as illustrated in FIG. 6, the augmented reality device may be implemented as monocular type glasses, which is worn by user for left eye or right eye. For another example, as illustrated in FIG. 7, the augmented reality device may also be implemented as binocular type glasses. No limitation will be given in the embodiments of the present disclosure in this respect, the following embodiments are the same in this aspect, and no further description will be given.

Figure 8:
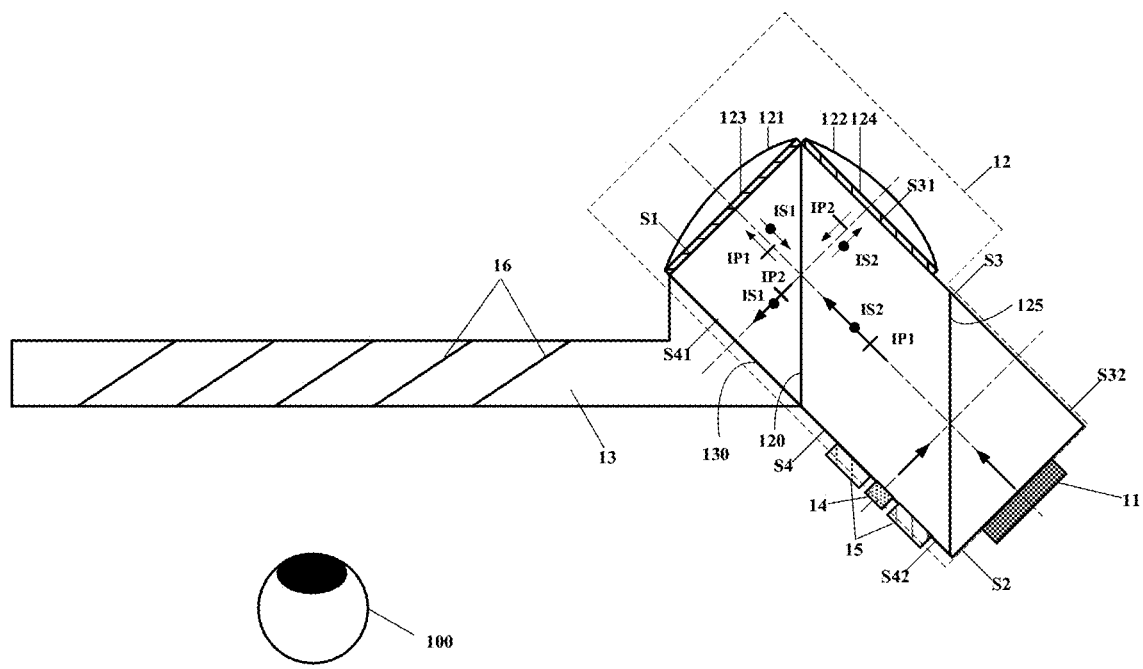
FIG. 8 is a schematic diagram of an augmented reality device provided by further another embodiment of the present disclosure.

For example, as illustrated in FIG. 8, both the infrared light emitter 14 and the infrared light detector 15 may also be provided at the second end of S42 of the fourth side S4 of the augmented reality element 12, and the second end of S42 of the fourth side S4 is closer to the second side S2. Similarly, the micro display 11 is provided at the second side S2, which is opposite to the first side S1, of the augmented reality element 12, and this is consistent with the embodiment as illustrated in FIG. 6; the first infrared beam splitter 125 is configured to allow the infrared light originated from the infrared light emitter 14 to be reflected to the polarization beam splitter 120, and to allow the light, which is emitted by the micro display 11, to be transmitted and be incident onto the polarization beam splitter 120. It should be noted that, the position where the first infrared beam splitter 125 is provided may be correspondingly changed in this case, so that the infrared light which is emitted by the infrared light emitter 14 can be reflected to the polarization beam splitter 120.

Figure 9:
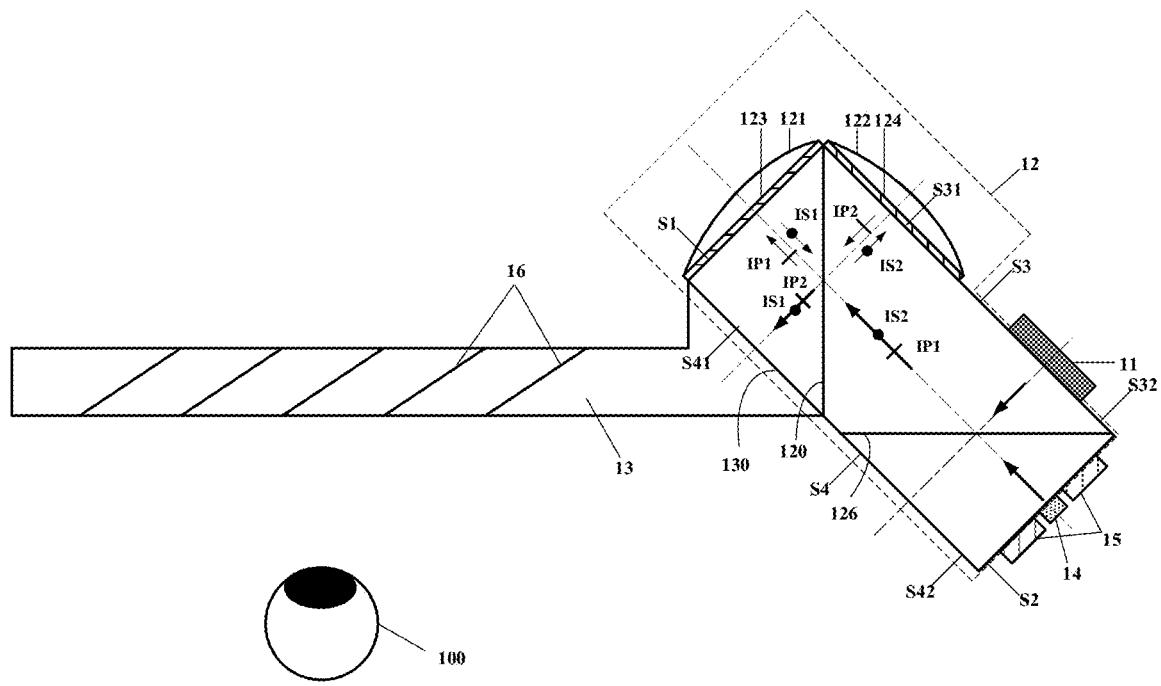
FIG. 9 is a schematic diagram of an augmented reality device provided by further another embodiment of the present disclosure.

For example, in an embodiment of the present disclosure, as illustrated in FIG. 9, the augmented reality element 12 may also comprise a second infrared beam splitter 126. Both the infrared light emitter 14 and the infrared light detector 15 are provided at the second side S2, which is opposite to the first side S1, of the augmented reality element 12. The micro display 11 is provided at the second end of S32 of the third side S3 of the augmented reality element 12, and the second end of S32 of the third side S3 is closer to the second side S2.

For example, the second infrared beam splitter 126 is configured to allow the infrared light originated from the infrared light emitter 14 to be transmitted and be incident onto the polarization beam splitter 120, and allow the light, which is emitted by the micro display 11, to be reflected to the polarization beam splitter 120. That is, the function of the second infrared beam splitter 126 is to reflect the light, which is emitted by the micro display 11 and is in the visible wavelength range, and to transmit the infrared light, which is emitted by the infrared light emitter 14.

Figure 10:
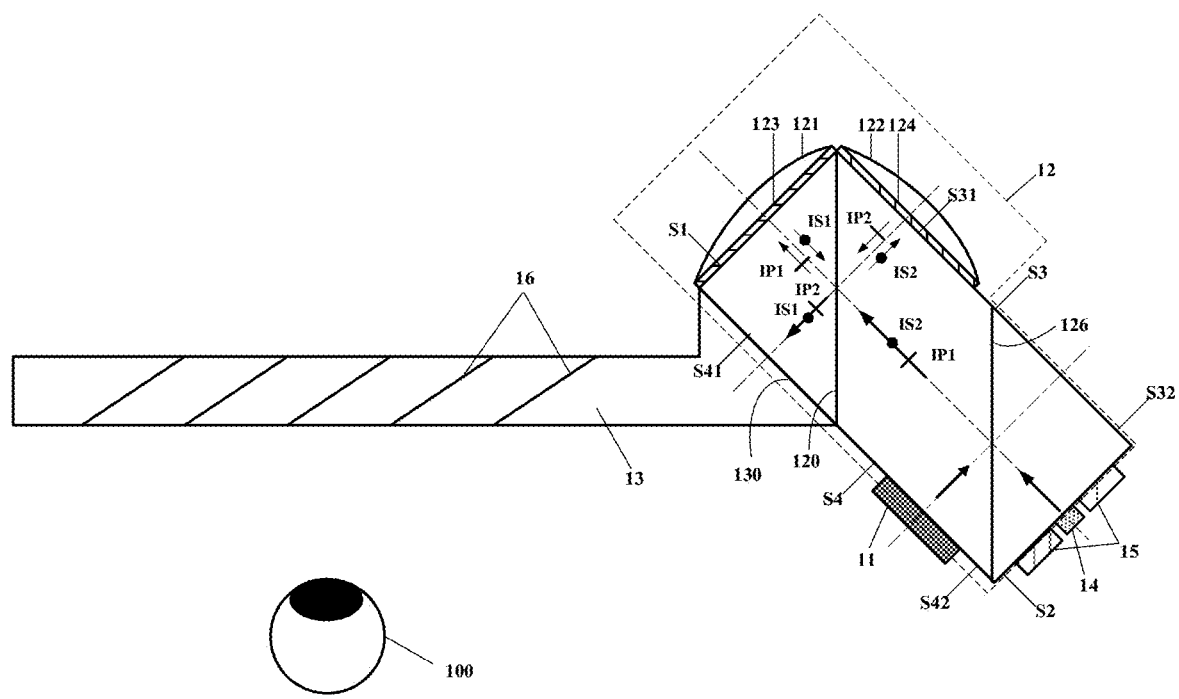
FIG. 10 is a schematic diagram of an augmented reality device provided by still another embodiment of the present disclosure.

For example, as illustrated in FIG. 10, the micro display 11 may also be provided at the second end of S42 of the fourth side S4 of the augmented reality element 12, and the second end of S42 of the fourth side S4 is closer to the second side S2 and is opposite to the second end of S32 of the third side S3. Similarly, both the infrared light emitter 14 and the infrared light detector 15 are provided at the second side S2, which is opposite to the first side S1, of the augmented reality element 12, and this is consistent with the embodiment as illustrated in FIG. 9; the second infrared beam splitter 126 is configured to allow the infrared light originated from the infrared light emitter 14 to be transmitted and be incident onto the polarization beam splitter 120, and allow the light, which is emitted by the micro display 11, to be reflected to the polarization beam splitter 120. It should be noted that, the position where the second infrared beam splitter 126 is provided may be correspondingly changed in this case, so that the light, which is emitted by the micro display 11, can be reflected to the polarization beam splitter 120.

In the augmented reality device provided by the embodiments of the present disclosure, by providing the infrared light emitter 14 and the infrared light detector 15, the infrared light which is emitted by the infrared light emitter 14 can be transmitted to the human eye via the augmented reality element 12 and the optical waveguide element 13, the reflected infrared light, which is reflected by the human eye, is transmitted to the infrared light detector 15 along a path which is opposite to the previous path, the infrared light detector 15 can detect the intensity of the reflected infrared light. For example, the reflectivity of the human eye when the eye is opened is different from the reflectivity of the human eye when the eye is closed, that is, the reflectivity of the eye ball of the human eye is different from the reflectivity of the eyelid of the human eye, and therefore, the closure time or the closure frequency of the human eye can be determined based on the intensity of the reflected infrared light which is detected by the infrared light detector 15, such that whether or not the user which wears, for example, the augmented reality device is in a fatigue state can be determined, and certain measures can be further taken to allow the user to stay awake in the case where it is determined that the user in the fatigue state. Therefore, improved safety can be achieved.

For example, the augmented reality device may be implemented as glasses (monocular or binocular), the user may wear the augmented reality device during driving a car, such that auxiliary driving and improved safety can be achieved. Furthermore, the augmented reality device can adopt a light weight design, and is easy to wear; the augmented reality device is very compatible with all kinds of vehicles, and therefore, reforming of the vehicles is not necessary, and the requirement of universal applicability for vehicles is satisfied.

For another example, in the case where the user is engaged in a high-risk work which needs the user to keep awake, the user may wear the augmented reality device, so as to monitor whether or not the user is in the fatigue state.

In the embodiments of the present disclosure, for example, the wavelength of the infrared light which is emitted by the infrared light emitter 14 may be equal to or larger than 4 microns, while equal to or smaller than 13 microns, so as to avoid harming the human eye.

Figure 11:
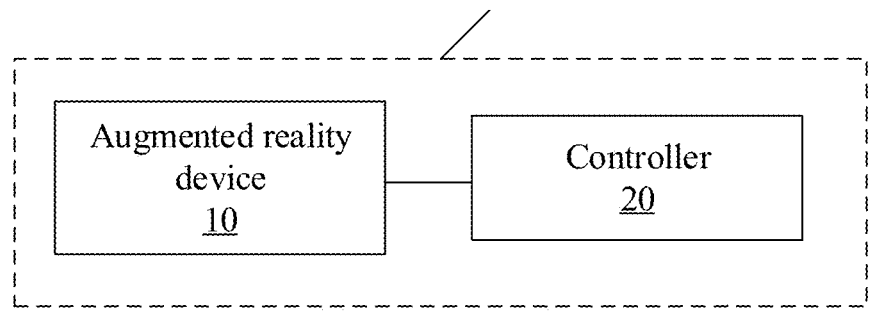
FIG. 11 is a schematic diagram of an augmented reality system provided by an embodiment of the present disclosure.

An embodiment of the present disclosure further provides an augmented reality system, and as illustrated in FIG. 11, the augmented reality system comprises an augmented reality device 10 and a controller 20. It should be understood that, the augmented reality device 10 is the augmented reality device provided by the embodiments of the present disclosure and comprising the infrared light emitter 14 and the infrared light detector 15. For example, the augmented reality devices as illustrated in FIGS. 3, 4, and 6-10 may be adopted.

For example, the controller 20 is configured for: determining whether or not the user, which is related to the augmented reality device 10, is in the fatigue state based on the intensity of the reflected infrared light which is detected by the infrared light detector 15; generating a control signal in the case where it is determined that the user in the fatigue state; and providing prompt information based on the control signal.

For example, the data about the intensity of the reflected infrared light, which is detected by the infrared light detector 15 in the augmented reality device 10, can be sent to the controller 20, the controller 20 can analyze the received data of the intensity of the reflected infrared light, so as to determine whether or not the user, which is related to the augmented reality device 10, is in the fatigue state. For example, the user, which is related to the augmented reality device 10, is the user wearing the augmented reality device 10. When the controller 20 determines that the user is in the fatigue state, the controller 20 may generate the control signal. For example, the prompt information may be provided to the user based on the control signal, so as to improve safety.

In the augmented reality system provided by the embodiments of the present disclosure, the controller 20 and the augmented reality device 10 may be provided on the same object. For example, in the case where the augmented reality device 10 is provided on glasses, the controller 20 may also be provided on the glasses (for example, a glasses leg of the glasses). For another example, the controller 20 may also be provided at a remote end with respect to the augmented reality device 10; for example, the controller 20 is provided at a server, and the augmented reality device 10 may communicate with the server through a network, for example, the controller 20 may send a determination result to the augmented reality device 10 through the network.

It should be understood that, the network described in the embodiments of the present disclosure may be communication networks of various types, the network includes but not limited to a local area network (LAN), a wide area network (WAN), an interconnection network (Internet), and so on. The network may be implemented as Ethernet, Token Ring, Fiber Distributed Data Interface (FDDI) network, asynchronous transfer mode network (ATM), and so on; the network includes but not limited to 3G/4G/5G mobile communication network, WLAN WIFI (Wireless Fidelity), wired communication network, and so on. Accordingly, the server may be implemented in a variety of forms, the server may include servers in LAN, WAN or Internet, for example, the server may be implemented as a cloud server, and the cloud service may be provided by a public cloud provider (typically Amazon, Aliyun, etc.) or in the form of private cloud.

For example, the controller 20 may be configured to determine whether or not the user is in the fatigue state based on the closure time or the closure frequency of the eyelid of the user. For example, the reflectivity of the human eye when the eye is opened is different from the reflectivity of the human eye when the eye is closed, that is, the reflectivity of the eye ball of the human eye is different from the reflectivity of the eyelid of the human eye, and therefore, the controller 20 may process the received data of the intensity of the reflected infrared light, so as to obtain the closure time or the closure frequency of the eyelid of the user, such that whether or not the user is in the fatigue state can be determined.

Figure 12:
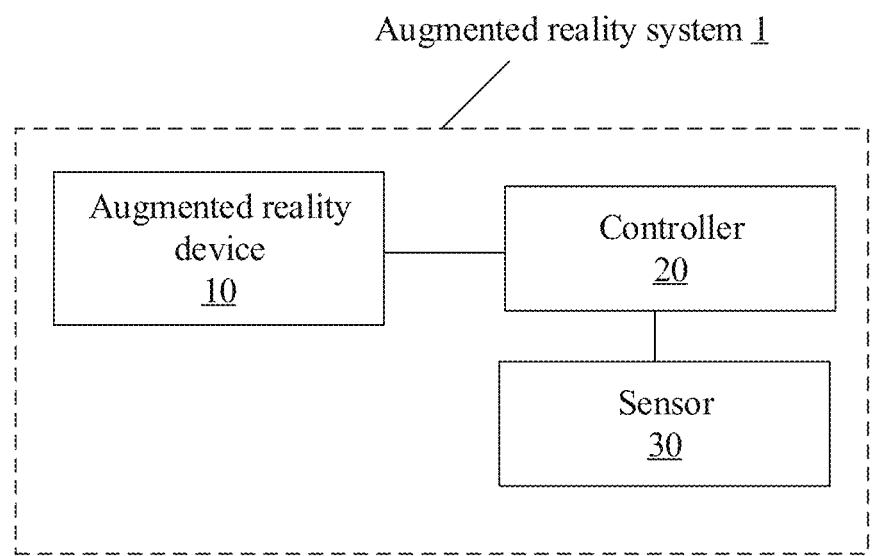
FIG. 12 is a schematic diagram of an augmented reality system provided by another embodiment of the present disclosure.

For example, in an embodiment of the present disclosure, as illustrated in FIG. 12, the augmented reality system 1 may further comprise a sensor 30. For example, the sensor 30 is configured to collect a physiological parameter of the use. For example, the sensor 30 comprises at least one of a blood pressure sensor and a pulse sensor.

For example, in an example, the sensor 30 may be a blood pressure sensor, such that the blood pressure of the user can be collected. For example, in another example, the sensor 30 may be a pulse sensor, such that the pulse of the user can be collected. For another example, in further another example, the sensor 30 may comprise a blood pressure sensor and a pulse sensor, such that the blood pressure and the pulse of the user can both be collected. It should be understood that, no limitation will be given in the embodiments of the present disclosure regarding the type of the sensor 30.

Figure 13:
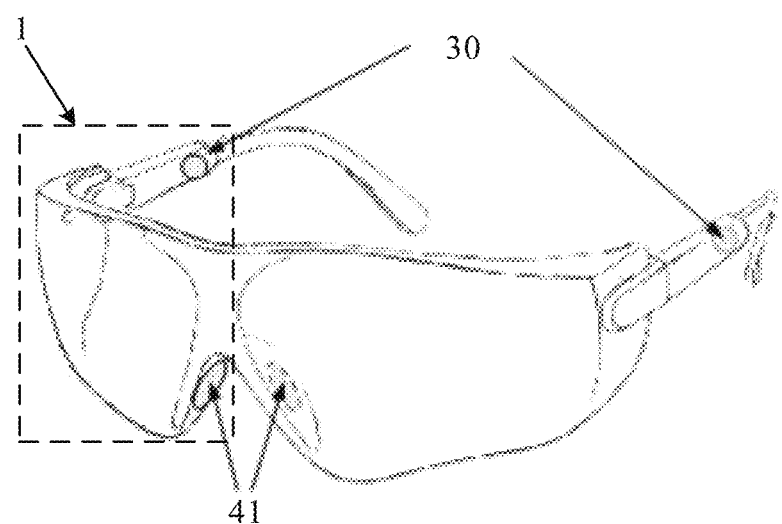
FIG. 13 is a schematic diagram of a pair of glasses, including an augmented reality system, provided by the embodiments of the present disclosure.

For example, as illustrated in FIG. 13, the augmented reality system provided by the embodiments of the present disclosure 1 can be specifically implemented as glasses, that is, the augmented reality system 1 may be provided on the glasses, and in this case, the sensor 30 may be provided at the inner side of a glasses leg, and in the case where the user wears the glasses, the sensor 30 can be close to the temple of the user. It should be understood that, FIG. 13 only exemplarily illustrates the augmented reality system 1, the augmented reality system 1 may be provided at one side of the glasses (monocular type), the augmented reality system 1 may also be provided at two sides of the glasses (binocular type), no limitation will be given in the embodiments of the present disclosure in this respect.

For example, as illustrated in FIG. 12, in the case where the augmented reality system 1 comprises the sensor 30, the controller 20 may be further configured for: determining whether or not the user is in an abnormal state based on the physiological parameter; generating a control signal in the case where it is determined that the user is in the abnormal state; and providing prompt information based on the control signal.

For example, the physiological parameter, which is collected by the sensor 30, of the user can be sent to the controller 20, the controller 20 can analyze the received physiological parameter, so as to determine whether or not the user is in the abnormal state. It should be understood that, in the embodiments of the present disclosure, the abnormal state, for example, may represent that the physiological parameter of the user is in an abnormal state. For example, a threshold range indicating that the physiological parameter is normal may be preset, and in the case where the physiological parameter received by the controller 20 is within the threshold range, it can be determined that the user is in the normal state, otherwise, it can be determined that the user is in the abnormal state. For example, the physiological parameter may be the blood pressure or the pulse. When the controller 20 determines that the user is in the abnormal state, the control signal can be generated, for example, prompt information can be provided to the user based on the control signal, so as to improve safety.

Figure 14:
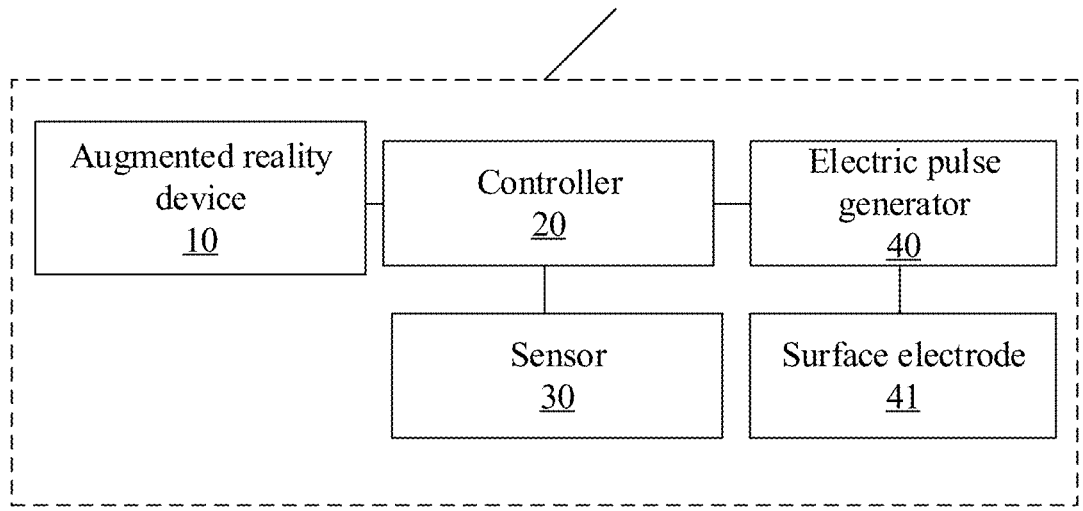
FIG. 14 is a schematic diagram of an augmented reality system provided by further another embodiment of the present disclosure.

For example, in an embodiment of the present disclosure, as illustrated in FIG. 14, the augmented reality system 1 may further comprise an electric pulse generator 40 and a surface electrode 41. The electric pulse generator 40 is configured to generate an electric pulse signal in response to the control signal, and to transmit the electric pulse signal to the surface electrode 41.

With reference to the glasses as illustrated in FIG. 13 again, for example, the surface electrode 41 may be provided at a position adjacent to a nosewing of the glasses, the glasses as illustrated in FIG. 13 provides the surface electrodes 41 at positions adjacent to nosewings at two sides of the glasses, and no limitation will be given to the present disclosure in this respect. For example, the surface electrode 41 may also be only provided at a position adjacent to only one nosewing at one side of the glasses.

For example, in the case where the augmented reality system 1 is implemented as glasses, the user can wear the glasses when driving a car or engaging in other activities (for example, engaging in high risk work). In the case where the controller 20 determines that the user in the fatigue state or in the abnormal state, the control signal can be generated, the electric pulse generator 40 can generate the electric pulse signal in response to the control signal and transmit the electric pulse signal to the surface electrode 41. Because the surface electrode 41 is in direct contact with the nose of the user, the electric pulse signal can be conducted to the user, so as to perform electrical stimulation to the user and to remind the user to pay attention to safety.

Figure 15:
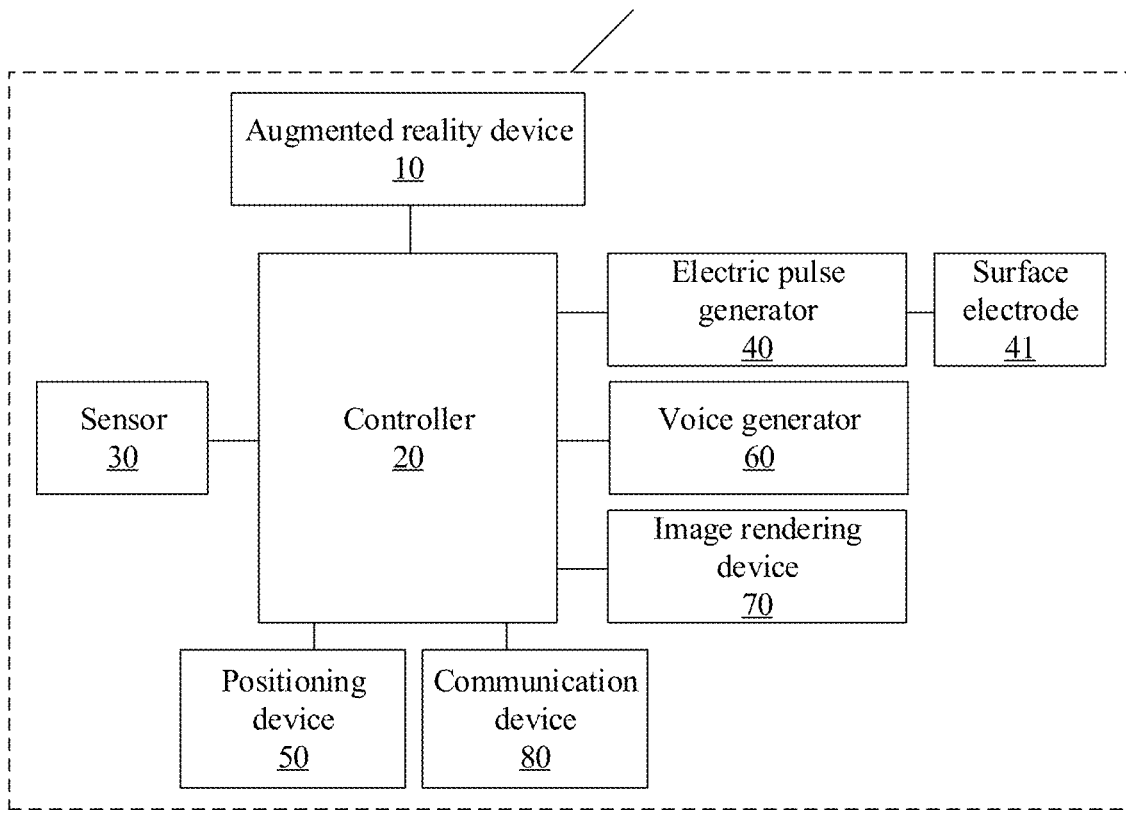
FIG. 15 is a schematic diagram of an augmented reality system provided by still another embodiment of the present disclosure.

For example, in an embodiment of the present disclosure, as illustrated in FIG. 15, the augmented reality system 1 may further comprise a positioning device 50. For example, the positioning device 50 is configured to acquire the position information of the user. For example, the positioning device 50 may be GPS (Global Position System) or Beidou positioning system, and no limitation will be given in the embodiments of the present disclosure in this respect.

In the augmented reality system provided by the embodiments of the present disclosure, by providing the positioning device, the position information of the user may be acquired in real time, and the augmented reality system may perform further processes based on the position information. For example, the augmented reality system may provide related prompt information to the user based on the position information, or the position information may be sent to a third party related to the user.

For example, in an embodiment of the present disclosure, as illustrated in FIG. 15, the augmented reality system 1 may further comprise a voice generator 60. For example, the voice generator 60 is configured to play the prompt information in response to the control signal, the prompt information comprises at least one of preset voice information and position information, and the position information is generated based on the position information of the user, regarding nearby hospital or resting place.

For example, when the user uses (for example, wears) the augmented reality system 1, in the case where the controller 20 determines that the user is in the fatigue state or in the abnormal state, the control signal can be generated and sent to the voice generator 60, the voice generator 60 can play the prompt information in response to the control signal. For example, the voice generator 60 may comprise a speaker, in the case where the augmented reality system 1, for example, adopts the glasses configuration as illustrated in FIG. 13, the speaker may be provided on the glasses, but specific position of the speaker is not limited. For example, the speaker may be provided on a glasses leg.

For example, in an example, the prompt information played by the voice generator 60 may be preset voice information. For example, the preset voice information may be pre-stored in the controller 20, and in the case where the controller 20 determines that the user is in the fatigue state or in the abnormal state, the controller 20 can send the preset voice information stored in the controller 20 to the voice generator 60 to play. For another example, the preset voice information may also be pre-stored in the voice generator 60, and in the case where the voice generator 60 receives the control signal from the controller 20, the voice generator 60 directly play the preset voice information. In this case, the voice generator 60 needs to comprise a storage medium.

For example, the preset voice information may be "please go to a nearby rest place for rest" or "please go to the nearby hospital for inspection", and so on, no limitation will be given in the embodiments of the present disclosure regarding the content of the preset voice information.

For another example, in another example, the prompt information played by the voice generator 60 may be at least one of the position information, which is generated based on the position information of the user, of a nearby hospital or a rest place. For example, the controller 20 can generate the position information of the nearby hospital or the rest place based on the position information, which is acquired from the positioning device 50, of the user, and transform the position information of the nearby hospital or the rest place into voice, and send the voice to the voice generator 60, the voice is played by the voice generator 60. Alternatively, the controller 20 can directly send the position information of the nearby hospital or the rest place to the voice generator 60, and the voice generator 60 transform the position information of the nearby hospital or the rest place into voice, and then plays the voice.

In the augmented reality system provided by the embodiments of the present disclosure, by providing the voice generator, the prompt information may be played in the case where the user is in the fatigue state or in the abnormal state, such that the user is reminded, and the safety is improved.

For example, in an embodiment of the present disclosure, as illustrated in FIG. 15, the augmented reality system 1 may further comprise an image rendering device 70. For example, the image rendering device 70 is configured to render an image corresponding to the prompt information in response to the control signal, the micro display is configured to emit the light containing the prompt information, the prompt information comprises at least one of preset image information and navigation information, and the navigation information is generated based on the position information of the user, of the nearby hospital or the rest place.

For example, when the user uses (for example, wears) the augmented reality system 1, in the case where the controller 20 determines that the user is in the fatigue state or in the abnormal state, the control signal can be generated and sent to the image rendering device 70, and the image rendering device 70 can render the image corresponding to the prompt information in response to the control signal. The controller 20 can send the image rendered by the image rendering device 70 to the micro display in the augmented reality device 10, and the micro display can emit the light containing the prompt information, such that the prompt to the user can be achieved.

For example, in the embodiments of the present disclosure, the image rendering device 70 and the controller 20 may be separately arranged, or may be integrally arranged, that is, the image rendering device 70 and the controller 20 may be encapsulated together in hardware, no limitation will be given in the embodiments of the present disclosure in this respect.

For example, in an example, the prompt information rendered by the image rendering device 70 may be preset image information, and for example, the preset image information may be pre-stored in the controller 20; in the case where the controller 20 determines that the user is in the fatigue state or in the abnormal state, the controller 20 can send the preset image information stored in the controller 20 to the image rendering device 70 for rendering. For another example, the preset image information may be pre-stored in the image rendering device 70, and in the case where the image rendering device 70 receives the control signal from the controller 20, the image rendering device 70 directly renders the preset image information. In this case, the image rendering device 70 needs to comprise a storage medium.

For example, the preset image information may be an image with reminding or warning function. For example, the preset image information may be an image showing red exclamation mark "!". For another example, the preset image information may be an image showing words of "please pay attention to safety" in red color. No limitation will be given in the embodiments of the present disclosure regarding the content of the preset image information.

For another example, in another example, the prompt information rendered by the image rendering device 70 may be at least one of navigation information, which is generated based on the position information of the user, of the nearby hospital or the rest place. For example, the controller 20 can generate the navigation information of the nearby hospital or the rest place based on the position information, which is acquired from the positioning device 50, of the user, and send the navigation information of the nearby hospital or the rest place to the image rendering device 70, and the image rendering device 70 renders the navigation information into a corresponding image. The controller 20 can send the image rendered by the image rendering device 70 to the micro display in the augmented reality device 10, and the micro display can emit the light containing the navigation information, so as to prompt the user regarding navigation.

In the augmented reality system provided by the embodiments of the present disclosure, by providing the image rendering device, the prompt information can be displayed via the augmented reality device in the case where the user is in the fatigue state or in the abnormal state, so as to remind the user or to prompt the user regarding navigation, such that improved safety or convenience can be achieved.

For example, in an embodiment of the present disclosure, as illustrated in FIG. 15, the augmented reality system 1 may further comprise a communication device 80, and the communication device 80 is configured to communicate with a preset contact person in response to the control signal.

For example, when the user uses (for example, wears) the augmented reality system 1, in the case where the controller 20 determines that the user is in the fatigue state or in the abnormal state, the control signal cam be generated, and the communication device 80 can communicate with the preset contact person in response to the control signal. For example, the communication device 80 may communicate with the preset contact person through sending texts or making phone calls. For example, the data of the physiological parameter of the user may be sent to the preset contact person. For example, the preset contact person may be pre-stored in the controller 20 or the communication device 80, and the preset contact person may be a guardian, doctor and so on of the user.

For example, the communication device 80 can communicate with the preset contact person through a network, the descriptions of the network may refer to corresponding descriptions in the above-mentioned embodiments, and no further descriptions will be given here.

In the augmented reality system provided by the embodiments of the present disclosure, by providing the communication device, the preset contact person can be contacted in the case where the user is in the fatigue state or in the abnormal state, the preset contact person may take further measures to guarantee the safety of the user, comprehensive protection can be provided to the user, such that improved safety may be achieved.

It should be understood that, the controller 20 and the image rendering device 70 in the augmented reality system 1 provided by the embodiments of the present disclosure may be implemented by a means including an application specific IC (ASIC), a hardware (circuit), a firmware or any other combination, to achieve a desired function; and for example, they may be specifically implemented as a digital signal processor. No limitation will be given in the embodiments of the present disclosure in this respect.

In the embodiments of the present disclosure, the processor may be implemented by a general-purpose integrated circuit chip or an application specific integrated circuit chip. For example, the integrated circuit chip may be set on a motherboard, for example, a memory and a power supply circuit may also be set on the motherboard; furthermore, the processor may also be implemented by a circuit, a software, a hardware (circuit), a firmware or any combination of the software, the hardware (circuit) and the firmware. In embodiments of the present disclosure, the processor may comprise various computing structures, for example, a complex instruction set computer (CISC) architecture, a reduced instruction set computer (RISC) architecture, or a structure that implements a combination of instruction sets. In some embodiments, the processor may also be a microprocessor, for example, an X86 processor or an ARM processor, or may be a digital processor (DSP), and so on.

In the embodiments of the present disclosure, a storage medium, for example, may be provided at the above-mentioned motherboard, the storage medium may store instructions and/or data executed by the processor. For example, the storage medium may include one or more computer program products, and the computer program products may include computer readable storage media in various forms, for example, a volatile memory and/or a non-volatile memory. The volatile memory, for example, may include a random access memory (RAM) and/or a cache, and so on. The non-volatile memory, for example, may include a read-only memory (ROM), a magnetic disk, a compact disc (CD), a semiconductor memory (for example, a flash memory, etc.) and so on. One or more computer program instructions may be stored on the computer readable storage medium. The processor may run the program instructions to realize (realized by the processor) desired functions in the embodiment of the present disclosure.

Figure 16:
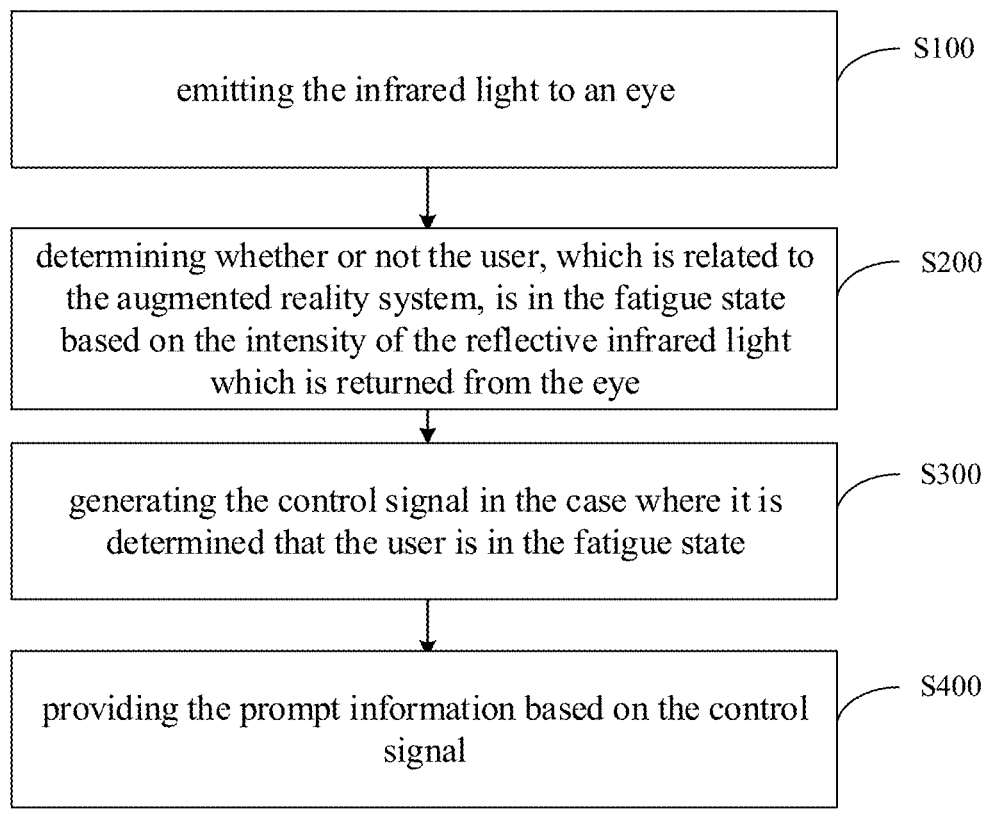
FIG. 16 is an information prompt method of an augmented reality system provided by an embodiment of the present disclosure.

An embodiment of the present disclosure further provides an information prompt method of an augmented reality system, as illustrated in FIG. 16, the information prompt method may comprise the following operations.

Step S100: emitting infrared light to an eye;

Step S200: determining whether or not the user, which is related to the augmented reality system, is in a fatigue state based on the intensity of the reflected infrared light which is returned from the eye;

Step S300: generating a control signal in the case where it is determined that the user in the fatigue state; and Step S400: providing prompt information based on the control signal.

Detail description regarding the information prompt method and its technical effect may refer to corresponding descriptions in the above-mentioned embodiments, and no further descriptions will be given here.

What are described above are specific implementations of the disclosure, but the scopes of the disclosure are not limited to the above-mentioned implementations, and the scopes of the disclosure are defined by the accompanying claims.

What is claimed is:

1. An augmented reality device, comprising a micro display and an augmented reality element,
wherein the micro display is configured to emit light carrying display content, the light comprises a first light portion in a first polarization state and a second light portion in a second polarization state;
the augmented reality element is configured to convert the first light portion from the first polarization state into the second polarization state, to convert the second light portion from the second polarization state into the first polarization state, and to couple out the first light portion in the second polarization state and the second light portion in the first polarization state; and
the first polarization state is perpendicular to the second polarization state,
wherein the augmented reality device further comprises an optical waveguide element, an infrared light emitter, and an infrared light detector,
wherein the infrared light emitter is configured to emit infrared light to the augmented reality element;
the augmented reality element is configured to couple the infrared light into an incident surface of the optical waveguide element;
the optical waveguide element is configured to transmit the infrared light to an eye via a semi-reflective semi-transmissive surface array;
the optical waveguide element and the augmented reality element is further configured to transmit reflected infrared light which is reflected by the eye to the infrared light detector along a path which is opposite to a path of the infrared light; and
the infrared light detector is configured to detect the reflected infrared light,
wherein the infrared light which is emitted by the infrared light emitter comprises a first infrared light portion in the first polarization state and a second infrared light portion in the second polarization state;
wherein the augmented reality element comprises a polarization beam splitter, a first concave mirror, a second concave mirror, a first phase retarder, and a second phase retarder;
the polarization beam splitter is configured to transmit the first infrared light portion in the first polarization state, and to reflect the second infrared light portion in the second polarization state;
the first infrared light portion, which is transmitted by the polarization beam splitter, is configured to pass through the first phase retarder, to be reflected by the first concave mirror, and to pass through the first phase retarder again, wherein the first infrared light portion is converted from the first polarization state into the second polarization state under the combined action of the first phase retarder and the first concave mirror;
the second infrared light portion, which is reflected by the polarization beam splitter, is configured to pass through the second phase retarder, to be reflected by the second concave mirror, and to pass through the second phase retarder again, wherein the second infrared light portion is converted from the second polarization state into the first polarization state under and combined action of the second phase retarder and the second concave mirror;
the polarization beam splitter is further configured to reflect the first infrared light portion in the second polarization state and to transmit the second infrared light portion in the first polarization state, and to allow both the first infrared light portion and the second infrared light portion to be coupled onto the incident surface of the optical waveguide element; and
the optical waveguide element is configured to transmit the first infrared light portion and the second infrared light portion after coupling to the eye via the semi-reflective semi-transmissive surface array.

2. The augmented reality device according to claim 1,
wherein the optical waveguide element is further configured to receive and transmit the first light portion and the second light portion which are coupled out by the augmented reality element;
the polarization beam splitter is further configured to receive the light originated from the micro display, to transmit the first light portion in the first polarization state, and to reflect the second light portion in the second polarization state;
the first light portion, which is transmitted by the polarization beam splitter, is configured to pass through the first phase retarder, to be reflected by the first concave mirror, and to pass through the first phase retarder again, wherein the first light portion is converted from the first polarization state into the second polarization state under combined action of the first phase retarder and the first concave mirror;

the second light portion, which is reflected by the polarization beam splitter, is configured to pass through the second phase retarder, to be reflected by the second concave mirror, and to pass through the second phase retarder again, wherein the second light portion is converted from the second polarization state into the first polarization state under combined action of the second phase retarder and the second concave mirror; and the polarization beam splitter is further configured to reflect the first light portion in the second polarization state and to transmit the second light portion in the first polarization state, and to allow both the first light portion and the second light portion to be coupled onto the incident surface of the optical waveguide element.

3. The augmented reality device according to claim 2, wherein the first polarization state is p-polarization state, the second polarization state is s-polarization state, and the first phase retarder and the second phase retarder are quarter-wave phase retarders.

4. The augmented reality device according to claim 1, wherein the optical waveguide element is further configured to transmit the reflected infrared light which is reflected by the eye to the polarization beam splitter via the semi-reflective semi-transmissive surface array, the reflected infrared light comprises a first reflected light portion in the second polarization state and a second reflected light portion in the first polarization state;

the polarization beam splitter is further configured to reflect the first reflected light portion in the second polarization state, and to transmit the second reflected light portion in the first polarization state;

the first reflected light portion, which is reflected by the polarization beam splitter and is in the second polarization state, is configured to pass through the first phase retarder, to be reflected by the first concave mirror, and to pass through the first phase retarder again, wherein the first reflected light portion is converted from the second polarization state into the first polarization state under the combined action of the first phase retarder and the first concave mirror;

the second reflected light portion, which is transmitted by the polarization beam splitter and is in the first polarization state, is configured to pass through the second phase retarder, to be reflected by the second concave mirror, and to pass through the second phase retarder again, wherein the second reflected light portion is converted from the first polarization state into the second polarization state under the combined action of the second phase retarder and the second concave mirror; and the polarization beam splitter is further configured to transmit the first reflected light portion in the first polarization state and to reflect the second reflected light portion in the second polarization state, and to allow both the first reflected light portion and the second reflected light portion to pass through the polarization beam splitter and to be transmitted to the infrared light detector.

5. The augmented reality device according to claim 1, wherein both the first phase retarder and the first concave mirror are provided at a first side of the augmented reality element;

both the second phase retarder and the second concave mirror are provided at a first end of a third side, which is adjacent to the first side, of the augmented reality element, and the first end of the third side is closer to the first side; and the incident surface of the optical waveguide element is provided at a first end of a fourth side, which is adjacent to the first side, of the augmented reality element, and the first end of the fourth side is closer to the first side and is opposite to the first end of the third side.

6. The augmented reality device according to claim 5, wherein the micro display, the infrared light emitter and the infrared light detector are provided at a second side, which is opposite to the first side, of the augmented reality element.

7. The augmented reality device according to claim 5, wherein the augmented reality element further comprises a first infrared beam splitter;

the micro display is provided at a second side, which is opposite to the first side, of the augmented reality element;

both the infrared light emitter and the infrared light detector are provided at a second end of the third side of the augmented reality element, and the second end of the third side is closer to the second side; or, both the infrared light emitter and the infrared light detector are provided at a second end of the fourth side of the augmented reality element, and the second end of the fourth side is closer to the second side; and the first infrared beam splitter is configured to reflect the infrared light which is originated from the infrared light emitter to the polarization beam splitter, and to allow the light emitted by the micro display to be transmitted and to be incident onto the polarization beam splitter.

8. The augmented reality device according to claim 5, wherein the augmented reality element further comprises a second infrared beam splitter;

both the infrared light emitter and the infrared light detector are provided at a second side, which is opposite to the first side, of the augmented reality element;

the micro display is provided at a second end of the third side of the augmented reality element, and the second end of the third side is closer to the second side; or, the micro display is provided at a second end of the fourth side of the augmented reality element, and the second end of the fourth side is closer to the second side and is opposite to a second end of the third side; and the second infrared beam splitter is configured to allow the infrared light, which is originated from the infrared light emitter, to be transmitted and be incident onto the polarization beam splitter, and to reflect the light emitted by the micro display to the polarization beam splitter.

9. The augmented reality device according to claim 1, wherein the semi-reflective semi-transmissive surface array is provided in the optical waveguide element and comprises a plurality of semi-reflective semi-transmissive mirrors which are arranged in an array; and the semi-reflective semi-transmissive surface array is configured to:
transmit the light and the infrared light, which enter from the incident surface of the optical waveguide element and are incident onto the semi-reflective semi-transmissive surface array, to the eye; and
transmit the reflected infrared light which is reflected by the eye to the incident surface of the optical waveguide element, so as to allow the reflected infrared light to enter the augmented reality element.

10. An augmented reality system, comprising the augmented reality device according to claim 1 and a controller, wherein the controller is configured to:
  determine whether or not a user related to the augmented reality device is in a fatigue state based on intensity of the reflected infrared light which is detected by the infrared light detector;
  generate a control signal in a case where it is determined that the user is in the fatigue state; and
  provide prompt information based on the control signal.

11. The augmented reality system according to claim 10, wherein the controller is configured to determine whether or not the user is in the fatigue state based on closure time or a closure frequency of an eyelid of the user.

12. The augmented reality system according to claim 10, further comprising a sensor,
  wherein the sensor is configured to collect a physiological parameter of the user, and the sensor comprises at least one of a blood pressure sensor and a pulse sensor.

13. The augmented reality system according to claim 12, wherein the controller is further configured to:
  determine whether or not the user is in an abnormal state based on the physiological parameter;
  generate the control signal in a case where the user is in the abnormal state; and
  provide the prompt information based on the control signal.

14. The augmented reality system according to claim 10, further comprising an electric pulse generator and a surface electrode,
  wherein the electric pulse generator is configured to generate an electric pulse signal in response to the control signal and to transmit the electric pulse signal to the surface electrode.

15. The augmented reality system according to claim 10, further comprising a positioning device,
  wherein the positioning device is configured to acquire position information of the user.

16. The augmented reality system according to claim 10, further comprising a voice generator and a communication device,
  wherein the voice generator is configured to play the prompt information in response to the control signal, and
  the communication device is configured to communicate with a preset contact person in response to the control signal.

17. The augmented reality system according to claim 10, further comprising an image rendering device,
  wherein the image rendering device is configured to render image corresponding to the prompt information in response to the control signal, and the micro display is configured to emit light containing the prompt information.

18. An information prompt method for the augmented reality system according to claim 10, comprising:
  emitting the infrared light to the eye;
  determining whether or not the user, which is related to the augmented reality system, is in the fatigue state based on the intensity of the reflected infrared light which is returned from the eye;
  generating the control signal in the case where it is determined that the user is in the fatigue state; and
  providing the prompt information based on the control signal.

* * * * *